United States Patent Office 3,627,554
Patented Dec. 14, 1971

3,627,554
READILY DISPERSIBLE INORGANIC PIGMENTS
August Bockmann and Klaus Prater, Krefeld, Hans Rudolph, Krefeld-Bockum, and Wolfgang Wiegreffe, Krefeld, Germany, assignors to Farbenfabriken Bayer Aktiengesellschaft, Leverkusen, Germany
No Drawing. Filed July 9, 1969, Ser. No. 840,473
Claims priority, application Germany, July 20, 1968,
P 17 92 086.4
Int. Cl. C09c 1/36, 3/02
U.S. Cl. 106—300                                   10 Claims

ABSTRACT OF THE DISCLOSURE

The dispersibility of inorganic pigments in, for example, resins, e.g. polyvinyl chloride, is improved by coating the pigment particles with an ether of a polyol with a least 3 OH-groups and a monofunctional alcohol.

---

This invention relates to readily dispersible inorganic pigments and to a process for their preparation.

It is known that inorganic pigments can be after-treated with organic substances in order to improve their dispersibility for example in resins or plastics such as PVC, polycarbonate, polystyrene, polyethylene, and lacquer resin binders, plasticisers and so on.

The following substances inter alia have been recommended for after-treatments; polyols (British patent specification 896,067), especially pentaerythritol and trimethylol propane, alkylene oxides and high molecular weight condensation products of alkylene oxides with amines, phenols, long-chain fatty alcohols (British patent specifications 944,292 and 1,115,334, U.S. patent specification 2,907,670).

This invention relates to readily dispersible inorganic pigments whose surfaces carry non-ionic substances and which are distinguished by the fact that the non-ionic substances are ethers formed from polyols with at least 3 OH-groups and monofunctional alcohols.

It has surprisingly been found that the ethers of polyols containing at least 3 OH-groups and monofunctional alcohols are particularly valuable after-treatment agents, one particular advantage over conventional ether-based after-treatment agents being embodied in the fact that the pigments coated in accordance with the invention form primary plasticiser pastes of relatively low viscosity, or the pastes can have a higher pigment content for the same viscosity.

If, for example a dispersion is prepared from a plasticiser with a pigment that has been treated with ethers of polyols and difunctional alcohols, the dispersion has a pasty consistency.

If by contrast the dispersion is prepared from a plasticiser and a pigment that has been pre-treated with an ether according to the invention, the dispersion is free-flowing and hence can be processed particularly easily. The improvement thus obtained in the flow properties of a pigment/plasticiser dispersion by the use in accordance with the invention of ethers of polyols containing at least 3 OH-groups and monofunctional alcohols could not be foreseen from the facts known from the literature.

Another advantage over conventional after-treatment agents is that the pigments coated in accordance with the invention surprisingly retain their outstanding dispersion properties, even in the event of prolonged storage.

Suitable starting materials for the substances to be used in accordance with the invention include polyhydric aliphatic alcohols with from 3 to 10 carbon atoms and preferably with from 3 to 6 carbon atoms, containing at least 3 OH-groups, usually from 3 to 6 and preferably from 3 to 4 OH-groups, such as for example glycerol, hexane-1,2,5-tri-ol, 1,1,1-trimethylol ethane, 1,1,1-trimethylol propane, 1,1,1-trimethylol butane, pentaerythritol and sugar alcohols of pentoses like arabinose or xylose and of hexoses like glucose or mannose. Trimethylol propane (trimethylol propane whenever referred to in this application is 1,1,1-trimethylol propane) is particularly suitable.

The aforementioned polyhydric alcohols are used in the form of their ethers with monofunctional alcohols. There is no need for all the OH-groups in the polyhydric alcohols to be etherified. On the contrary, it is desirable that only one or two OH-groups are etherified.

The ethers used are the reaction products of polyhydric alcohols with monofunctional, aliphatic, cycloaliphatic or aromatic alcohols such as for example with ethanol, propanol, n-butanol, n-decanol, isopentanol, allyl alcohol, benzyl alcohol, cyclohexanol, phenol, alkyl phenol, preferably alcohols of the formula R—OH in which R is a linear or branched alkyl radical with from 2 to 12 carbon atoms or an aromatic substituted alkyl, e.g. a benzyl radical.

The following are examples of the ethers used in accordance with the invention: trimethylolpropane monopropylether, trimethylolpropane dipropylether, trimethylolpropane monobutylether, trimethylolpropane dibutylether, trimethylolpropane tributylether, trimethylol propane monobenzylether, trimethylolpropane monoallylether, trimethylolpropane monodecylether, trimethylolpropane didecylether, pentaerythritol dibenzylether, glycerol didecylether and 1,1,1-trimethylolethane dibutylether.

The ethers of polyols with monofunctional alcohols are prepared by conventional etherification processes, for example by reacting polyols with alkyl halides in the presence of acid acceptors such as for example NaOH, tertiary amines and so on.

The monoethers and/or diethers of trimethylol propane with n-butanol, benzyl alcohol and decanol have an outstanding effect in the sense of the invention.

The substances used in accordance with the invention are employed in quantities of from 5% by weight to 0.1% by weight and preferably in quantities of from 2 to 0.5% by weight, based on dry pigment. It is possible to use the pure substances and also mixtures thereof. It is of advantage to use mixtures insofar as in this way the particular required hydrophilic or hydrophobic properties of the pigment can be obtained particularly easily.

The addition of the substances used in accordance with the invention to the pigment in measured quantities does not present any difficulties because the substances are liquid at room temperature and may conveniently be added to the pigment with and/or without solvents and/or emulsifiers.

The stage in the preparation of the pigment at which the agent influencing dispersibility is added to the pigment is not of decisive importance.

Treatment may be carried out by adding the organic substance undiluted, in solution or in emulsion to the untreated or inorganically after-treated pigment either before or during the final grinding operation carried out for example in a disc-attrition mill, ball mill, cage mill or steam-jet mill.

Another possibility of carrying out the treatment on titanium dioxide, for example, lies in mixing the substances used in accordance with the invention with the pigment in its filter cake after it has been after-treated by coating with inorganic substances such as for example $TiO_2$, $SiO_2$ and $Al_2O_3$ hydrates in a kneading process. The pigment containing from 94% to 98% of $TiO_2$ is then dried and ground.

The process is applicable to all inorganic white and colored pigments. Particularly advantageous results are obtained with titanium dioxide, iron and chromium oxide pigments. The dispersion properties of $TiO_2$ pigments in plastics, lacquer resin binders and so on are tested in so-called dissolver tests or scattering tests.

SCATTERING TEST

A black PVC-sheet is prepared on mixing rolls. The titanium dioxide pigment to be tested is then scattered over this black sheet in ½ minute. Any pigment adhering to the rolls is scraped off with a spatula and also worked into the sheet. Throughout the entire operation, the sheet is continuously turned by hand. After 1, 2, 4, 8 and 16 minutes, counting from the end of scattering, samples are taken during blending from the sheet situated on the roll.

The dispersibility of the pigments can be assessed from the non-dispersed pigment agglomerates in the form of speckles and streaks. Marks of 1 to 5 are given to the samples; the marks correspond to the number of minutes (1, 2, 4, 8 or 16) counting from the end of scattering. 1 (very good) corresponds to 1 and 2 minutes, 2 (good) corresponds to 4 minutes, 3 (satisfactory) corresponds to 8 minutes, 4 (moderate) corresponds to 16 minutes and 5 (poor) corresponds to more than 16 minutes. The test guarantees results that can be effectively reproduced with some practice.

COMPOSITION OF THE BLACK SHEET

| | Parts by weight |
|---|---|
| Emulsion PVC (K-value 70) | 50.00 |
| Dioctyl phthalate | 22.50 |
| Diphenyl thiourea | 0.25 |
| Flammruss 101 | 0.15 |

The carbon black "Flammruss 101" (a product of Degussa, Frankfurt am Main) is added in order to color the testing sheets. By this means undispersed $TiO_2$ becomes more visible. Instead of "Flammruss 101" any kind of carbon black could be used.

Processing conditions

Temperature 165° C., 15 revolutions per minute on the front roll and 12 r.p.m. on the rear roll. The sheet is 180–200µ thick.

DISSOLVER TEST 10 g. of the pigment to be examined are introduced into a black PVC paste and dispersed for 5 minutes with a laboratory stirrer with a dissolver disc rotating at 2500 r.p.m. Samples are taken after 1, 3 and 5 minutes. These samples are drawn onto a white card by means of a 240 µm. film drawer and then gelled for 15 minutes at 120° C. Dispersibility is readily assessed from clearly visible pigment speckles in conjunction with the varying shades of grey of the samples. Marks of 1 to 5 were given to the samples: 1=very good, 2=good, 3=satisfactory, 4=moderate, 5=poor.

PREPARATION OF THE BLACK PVC PASTE 100 parts by weight of emulsion PVC, K-value 70
42 parts by weight of dioctyl phthalate
0.5 part by weight of diphenyl thiourea
0.2 part by weight of "Flammruss 101"

are rubber twice on a three-roll stand, 25 parts of plasticiser are added and the mixture is stirred with a glass rod.

STABILITY IN STORAGE

Stability in storage was tested as follows: the prepared pigment was stored for 4 weeks at a pressure of 50 g./cm.². The products were then re-tested by the dissolver test. The results are set out in Table 1 by marks 1–5, which have the meanings mentioned above.

FLOW PROPERTIES

The flow properties of a plasticiser/pigment dispersion were characterised by the viscosity of the dispersion. 100 g. of the pigment to be tested and 100 g. of dioctyl phthalate were rubbed twice on a three-roll stand. The viscosities were measured in a Haake viscometer VT 23. For this purpose, the paste to be tested is poured into the measuring beaker up to the upper mark. The measuring beaker is then placed in the instrument and tempered for 10 minutes at 20° C. Measurement was carried out with the measuring element SV II at velocity stage 1. Steps must be taken to ensure that the measuring element rotates until a constant value has settled on the dial of the test instrument.

The subject of the invention is described in the following with reference to a series of tests which relate to the type of after-treatment and also give examples of the substances used in accordance with the invention with comparisons.

The figures obtained by the methods referred to above for dispersibility, whiteness, flow properties, and so on, are set out in Tables 1 and 2.

Example 1

A $TiO_2$ calciner discharge of rutile structure prepared by the sulphate process, having been ground and classified, is subjected to an inorganic after-treatment comprising the precipitation thereon of $TiO_2$ and $Al_2O_3$ hydrates. This after-treatment is carried out in an aqueous suspension containing approximately 20% by weight of $TiO_2$ with intensive stirring at a temperature of 60° C. The sludge is then filtered in a rotary filter and washed. The product from the rotary filter is converted back into a paste with water and delivered to a second rotary filter. The washed product from the second rotary filter (solids content 60%) is dried at 140 to 170° C. The pigment containing about 97% $TiO_2$ is micronised in a jet mill operated with superheated steam.

Example 2

After coating with $TiO_2$ and $Al_2O_3$ hydrates, the same rutile pigment as in Example 1 is filtered (the second filtering of Example 1), washed, dried and then sprayed with a reaction product of trimethylol propane with 3.5 mols of ethylene oxide (0.5% of substance, i.e. the ether, based on $TiO_2$). It is then ground in a jet mill under the same conditions as the pigment according to Example 1.

Example 3

The same rutile pigment as in Example 1 is after-treated, dried, sprayed with trimethylolpropane monobutylether (0.5% substance, based on $TiO_2$) and then ground in a steam jet mill under the same conditions as the pigment according to Example 1.

Example 4

After after-treatment and drying, the same rutile pigment as in Example 1 is sprayed with one of the mono- and/or diethers of trimethylol propane (0.5–1.5% of substance, based on $TiO_2$) used in accordance with the invention and listed in the following table, and then ground in a steam-jet mill like the pigments in Examples 1 to 3. The ethers are produced by reaction of trimethylol propane and an appropriate monofunctional compound so that one or more of the methylol groups of the trimethylol propane participate in the formation of an ether linkage.

Example 5

Before micronising in a jet mill operated with superheated steam, a synthetic iron oxide red pigment is sprayed with a mixture of trimethylol propane-mono- and di-butylether (OH—No. 410) (0.5% ether mixture, based on the pigment).

Example 6

A chromium oxide green pigment is sprayed before micronising in a steam jet mill with a mixture of trimethylol-propane-mono- and di-butylether (OH—No.

410) (0.5% ether mixture, based on the pigment) as in Example 3.

The figures obtained by the aforementioned methods both for the flow properties and for the dispersibility of the pigments are set out in Tables 1 and 2. Table 1 contains the results of the $TiO_2$ pigments prepared in accordance with Examples 1 to 4. The figures of the iron oxide and chromium oxide pigments obtained in accordance with Examples 5 and 6 are compared in Table 2 with those of the non-organic treated, but micronised (steam-jet mill) samples.

TABLE 1

| Pigment according to Example No.— | Organic substance (quantity based on $TiO_2$) | Flow properties viscosity cp. 20° in $TiO_2$/ DOP 1:1 | Dispersibility in PVC | | Stability under storage after 4 weeks |
|---|---|---|---|---|---|
| | | | Dissolver test | Scattering test | |
| 1 | None | 90,000 | 5 | 5 | |
| 2 | 0.5% of trimethylol propane reacted with 3.5 mols of ethylene oxide per mol | 30,000 | 4 | 5 | 5 |
| 3 | 0.5% of trimethylolpropane monobutylether | 8,000 | 2 | 3 | 2 |
| 4 | 1.0% of trimethylolpropane monobutylether | 6,200 | 2 | 3 | 2 |
| 4 | 1.5% of trimethylolpropane monobutylether | 5,150 | 2 | 3 | 2 |
| 4 | 1.0% of mono- and dibutyl ether of trimethylolpropane OH No. of mixture: 410 | 4,850 | 3 | 2 | 2 |
| 4 | 1.0% of trimethylolpropane monobenzylether | 10,900 | 1 | 2 | 1 |
| 4 | 1.0% of trimethylolpropane monoallylether | 8,480 | 1 | 2 | 1 |
| 4 | 1.0% of trimethylolpropane monodecylether | 13,300 | 2 | 5 | 2 |
| 4 | 1.0% of trimethylolpropane didecylether | 5,460 | 1 | 3 | 1 |

TABLE 2

| Example No. and pigment | Organic substance (quantity based on $TiO_2$) | Flow properties viscosity cp. 20° in $TiO_2$/ DOP 1:1 | Dispersibility in PVC | |
|---|---|---|---|---|
| | | | Dissolver test | Scattering test |
| 5. Iron oxide red | None | 40,500 | 5 | 5 |
| Do | 0.5% of mono- and dibutylether of trimethylol propane | 5,150 | 2 | 2 |
| 6. Chromium oxide green | None | 23,000 | 5 | 2 |
| Do | 0.5% of mono- and dibutylether of trimethylol propane | 10,500 | 2 | 2 |

What is claimed is:

1. Readily dispersible solid, inorganic pigments in the form of finely divided particles, the surfaces of which carry a non-ionic substance, and which are suitable for coloring resins by dispersing of the pigment in the resin, wherein the non-ionic substance comprises an ether of a polyol with at least 3 OH-groups and a monofunctional alcohol, in an amount effective to improve dispersibility of the pigment.

2. Readily dispersible inorganic pigments as claimed in claim 1, wherein the pigment is at least one of group titanium dioxide, iron oxide and chromium oxide.

3. Readily dispersible inorganic pigments as claimed in claim 1, wherein the amount of said ether is about 0.1 to 5% by weight, based on dry pigment.

4. Readily dispersible inorganic pigments as claimed in claim 1, wherein the polyol of the ether is an aliphatic alcohol with from 3 to 10 carbon atoms containing from 3 to 6 OH-groups which is etherified with a monofunctional alcohol of the general formula ROH wherein R is a linear or branched alkyl radical with from 2 to 12 carbon atoms or a benzyl radical.

5. Readily dispersible inorganic pigments as claimed in claim 1, wherein the ether is at least one of the group trimethylol propane-mono- and dialkylethers.

6. Readily dispersible inorganic pigments as claimed in claim 1, wherein the ether is at least one of the group trimethylol-propane-mono- and dialkarylethers.

7. Readily dispersible inorganic pigments as claimed in claim 2, wherein the amount of said ether is about 0.1 to 5% by weight, based on dry pigment.

8. Readily dispersible inorganic pigments as claimed in claim 2, wherein the polyol of the ether is an aliphatic alcohol with from 3 to 10 carbon atoms containing from 3 to 6 OH-groups which is etherified with a monofunctional alcohol of the general formula ROH wherein R is a linear or branched alkyl radical with from 2 to 12 carbon atoms or a benzyl radical.

9. Readily dispersible inorganic pigments as claimed in claim 2, wherein the ether is at least one of the group trimethylol-propane-mono- and dialkylethers.

10. Readily dispersible inorganic pigments as claimed in claim 2, wherein the ether is at least one of the group trimethylol-propane-mono- and dialkarylethers.

References Cited

UNITED STATES PATENTS

| 2,907,670 | 10/1959 | Katz et al. | |
| 3,076,719 | 2/1963 | Whately et al. | 106—308 Q |
| 3,451,835 | 6/1969 | Ganter et al. | 106—308 Q |

FOREIGN PATENTS

| 667,517 | 7/1965 | Belgium | 106—308 Q |

TOBIAS E. LEVOW, Primary Examiner

H. M. S. SNEED, Assistant Examiner

U.S. Cl. X.R.

106—302, 304, 308 Q; 260—37 M, 37 PC, 41 B

UNITED STATES PATENT OFFICE
CERTIFICATE OF CORRECTION

Patent No. 3,627,554      Dated Dec. 14, 1971

Inventor(s) August Bockmann, et al.

It is certified that error appears in the above-identified patent and that said Letters Patent are hereby corrected as shown below:

Col. 3, lines 61-63, cancel these lines and substitute therefor:

0.2 part by weight of "Flammruss 101" are rubbed twice on a three-roll stand, 25 parts of plasticiser are added and the mixture is stirred with a glass rod.

the mixture is stirred with a glass rod.

Signed and sealed this 6th day of June 1972.

(SEAL)
Attest:

EDWARD M. FLETCHER, JR.
Attesting Officer

ROBERT GOTTSCHALK
Commissioner of Patents